(12) United States Patent
Lee (10) Patent No.: US 7,453,694 B2
(45) Date of Patent: Nov. 18, 2008

(54) HEAT SINK PAD FOR NOTEBOOK COMPUTER

(76) Inventor: Cheng-Ping Lee, 1F, No. 13, Lane 191, Yonghe Rd., Jhonghe City, Taipei County (TW)

( * ) Notice: Subject to any disclaimer, the term of this patent is extended or adjusted under 35 U.S.C. 154(b) by 215 days.

(21) Appl. No.: 11/544,023

(22) Filed: Oct. 6, 2006

(65) Prior Publication Data

US 2008/0084661 A1  Apr. 10, 2008

(51) Int. Cl.
*G06F 1/20* (2006.01)
*H05K 7/20* (2006.01)

(52) U.S. Cl. .................. 361/687; 361/683; 361/695; 248/676

(58) Field of Classification Search .......... 361/683, 361/686–687, 694–695; 710/303–305; 248/676; D14/447
See application file for complete search history.

(56) References Cited

U.S. PATENT DOCUMENTS

| | | | |
|---|---|---|---|
| 6,672,380 B2 * | 1/2004 | Wei | 165/185 |
| 6,707,668 B2 * | 3/2004 | Huang | 361/687 |
| 6,738,256 B2 * | 5/2004 | Hsieh et al. | 361/687 |
| 6,754,072 B2 * | 6/2004 | Becker et al. | 361/687 |
| 7,038,909 B1 * | 5/2006 | Chen | 361/687 |
| 7,301,765 B2 * | 11/2007 | Huang | 361/695 |
| 2006/0073046 A1 * | 4/2006 | Kazuhiro | 417/423.14 |

FOREIGN PATENT DOCUMENTS

| | | | |
|---|---|---|---|
| CN | 201017687 Y | * | 2/2008 |
| DE | 202004015631 U1 | * | 1/2005 |
| WO | WO 2007142455 A1 | * | 12/2007 |

\* cited by examiner

*Primary Examiner*—Jayprakash N Gandhi
*Assistant Examiner*—Robert J Hoffberg
(74) *Attorney, Agent, or Firm*—Troxell Law Office, PLLC (57) ABSTRACT

A heat sink pad for notebook computer has a supporting unit and a guiding unit attached to the supporting unit. The supporting unit includes a flat plate which has a supporting portion bending downwardly from an end thereof. A plurality of through hole areas is defined in the flat plate. A guiding rail is formed on a downward surface of the flat plate. The guiding unit includes two casings movably provided on the guiding rail. Each casing defines a slot at a side thereof for corresponding to opposite sides of the flat plate. A fan is placed in each casing. Positions of the guiding units are freely adjusted to be suitable for diverse notebook computers for dissipating heat effectively.

8 Claims, 8 Drawing Sheets

HEAT SINK PAD FOR NOTEBOOK COMPUTER

BACKGROUND OF THE INVENTION (a) Field of the Invention

The present invention relates to a heat sink pad for notebook computer, and particularly to a heat sink pad for notebook computer automatically adjusting positions of a guiding unit thereof for effectively dissipating heat.

(b) Description of the Prior Art

Figure 7:
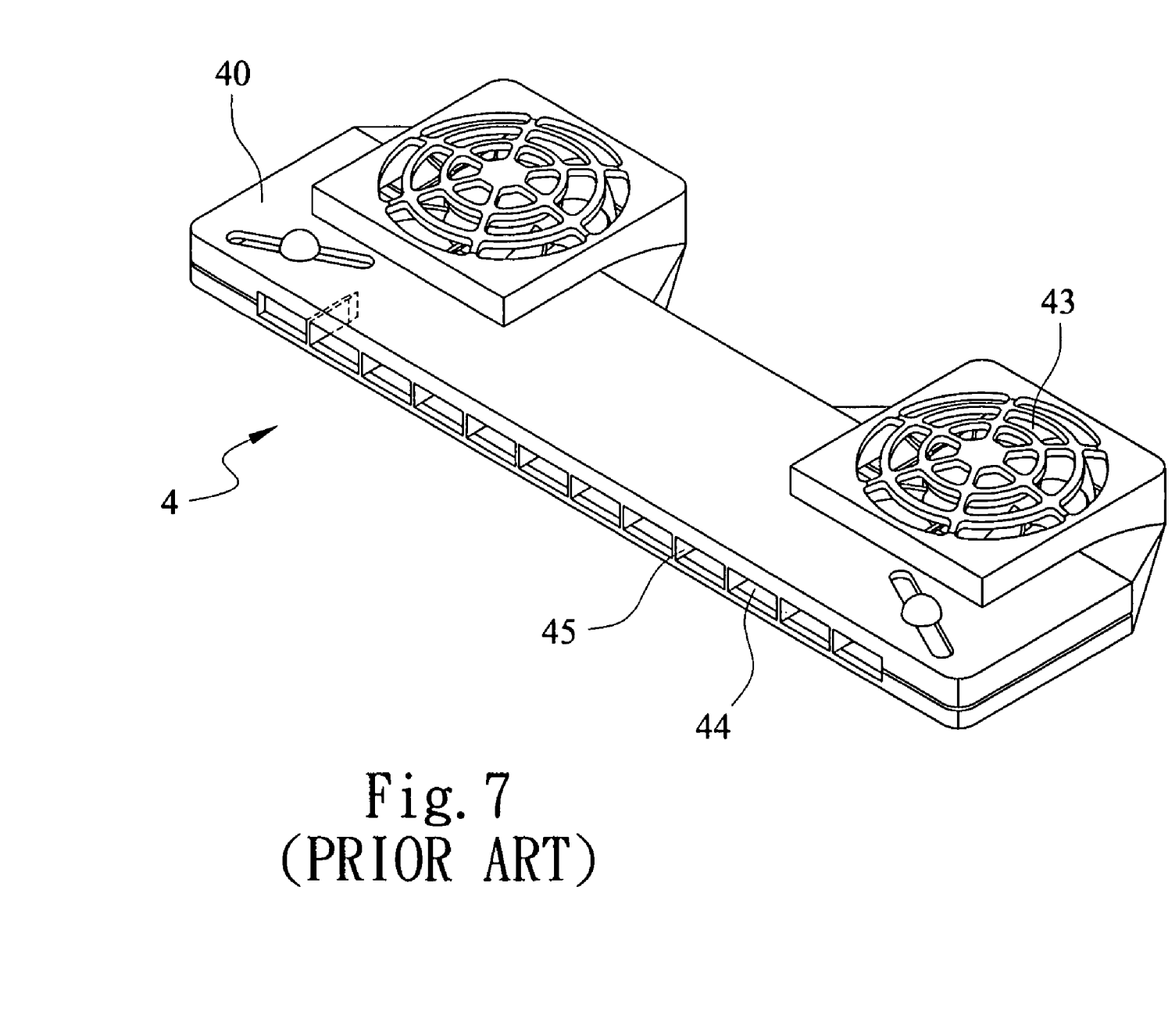
FIG. 7 is a perspective view of an exemplary conventional heat sink pad.
Figure 8:
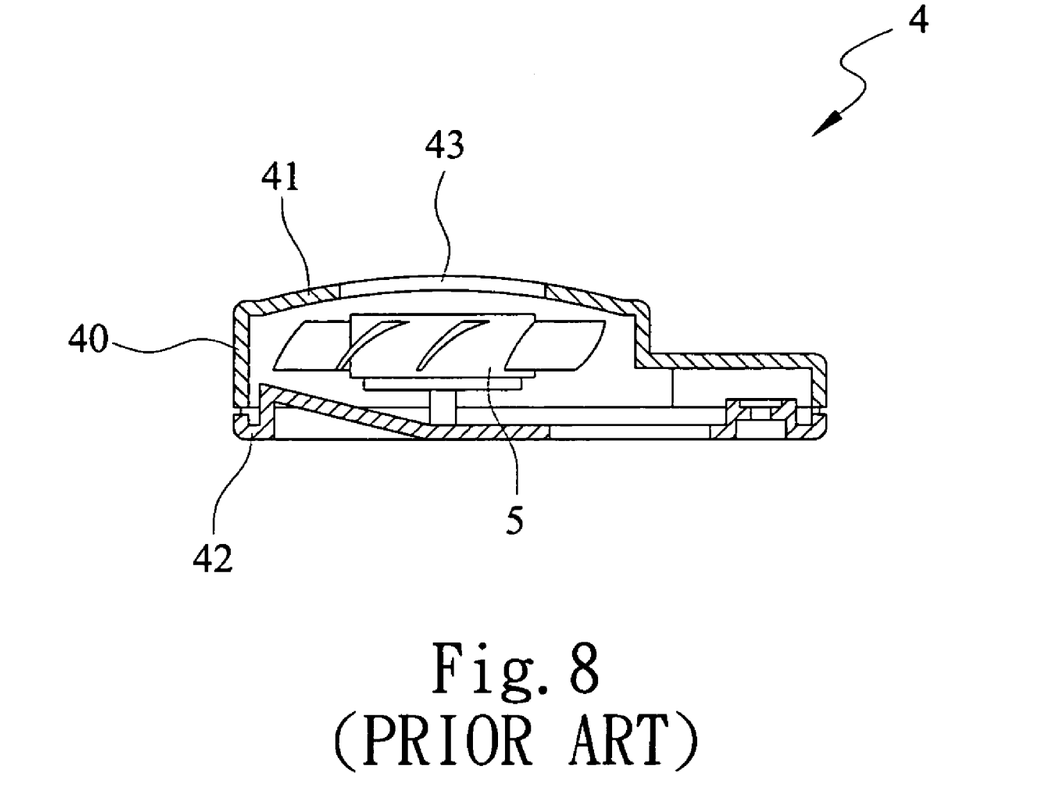
FIG. 8 is a cross-sectional view of the exemplary conventional heat sink pad.

FIGS. 7 and 8 illustrate a conventional heat sink pad for notebook computer. The heat sink pad 4 comprises a flat casing 40 which consists of an upper casing 41 and a lower casing 42. A fan 5 is mounted in the heat sink pad 4. Intake openings 43 are formed on the upper casing 41 and above the fan 5, and exhaust openings 44 are formed in the front of the heat sink pad 4. Guiding partitions 45 are formed between the exhaust openings 44. In this way, air is taken in through the intake openings 43, and is emitted through the exhaust openings 44. Cooling air thus enters into the notebook computer from a bottom thereof so as to dissipate heat.

However, the casing 40 is of fixed volume and profile, and the intake opening 43, the exhaust openings 44 and the fan. 5 are all fixed on the casing 40. Consequently, the heat sink pad 4 simply meets a specified notebook computer instead of being compatible with diverse types of notebook computers.

SUMMARY OF THE INVENTION

Accordingly, an object of the present invention is to provide a heat sink pad freely adjusting positions of a guiding unit thereof to suit for diverse notebook computers for dissipating heat.

A heat sink pad for notebook computer comprises a supporting unit and a guiding unit attached to the supporting unit. The supporting unit includes a flat plate which has a supporting portion bending downwardly from an end thereof. A plurality of through hole areas is defined in the flat plate and adjacent the supporting portion. A guiding rail is formed on a downward surface of the flat plate. The guiding unit is located adjacent the supporting portion, and includes two casings movable along the guiding rail. Each casing defines a slot at a side thereof for corresponding to opposite sides of the flat plate. At least a fan is placed in each casing.

DETAILED DESCRIPTION OF THE PREFERRED EMBODIMENTS

Figure 1:
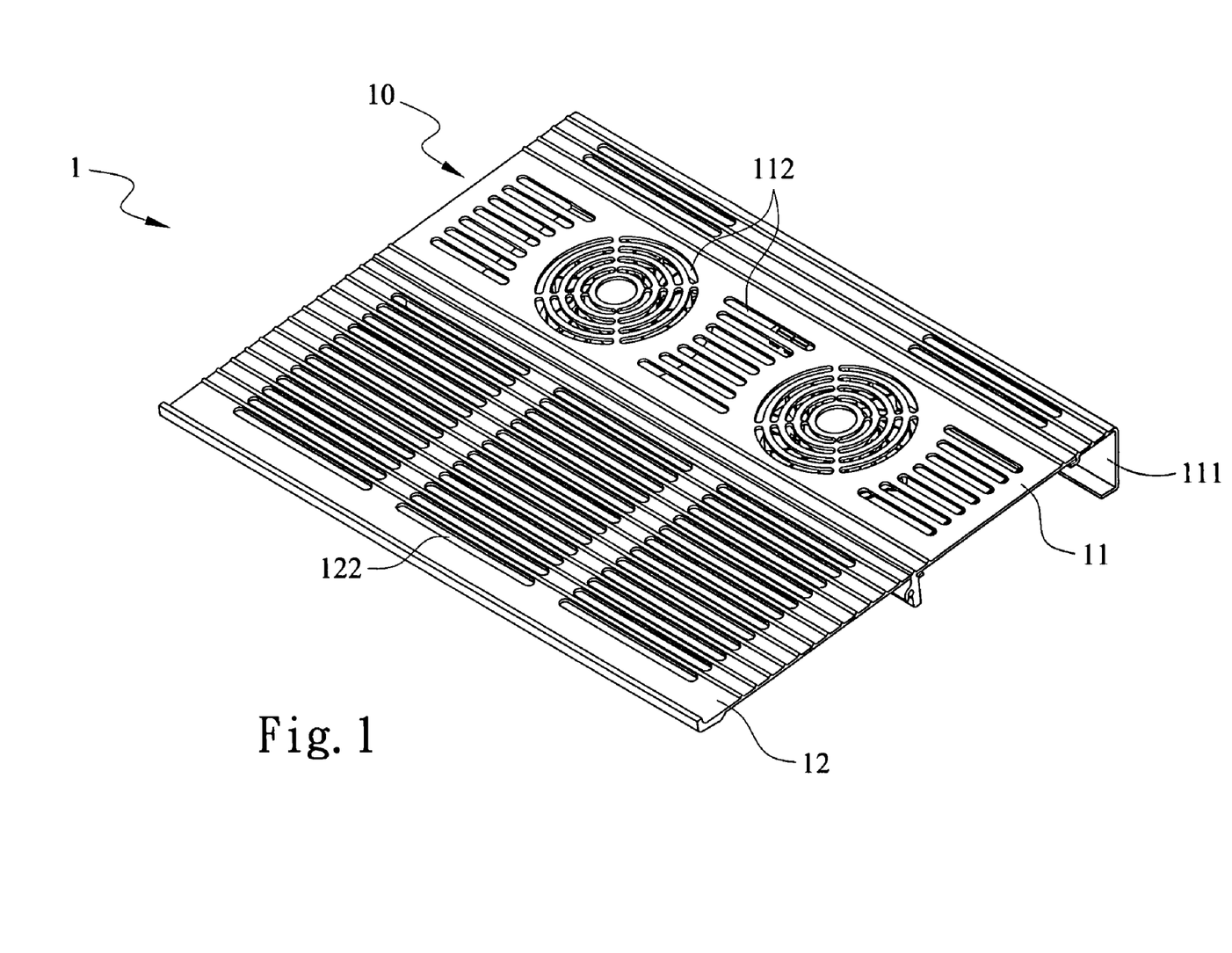
FIG. 1 is a perspective view of a heat sink pad of the present invention.
Figure 2:
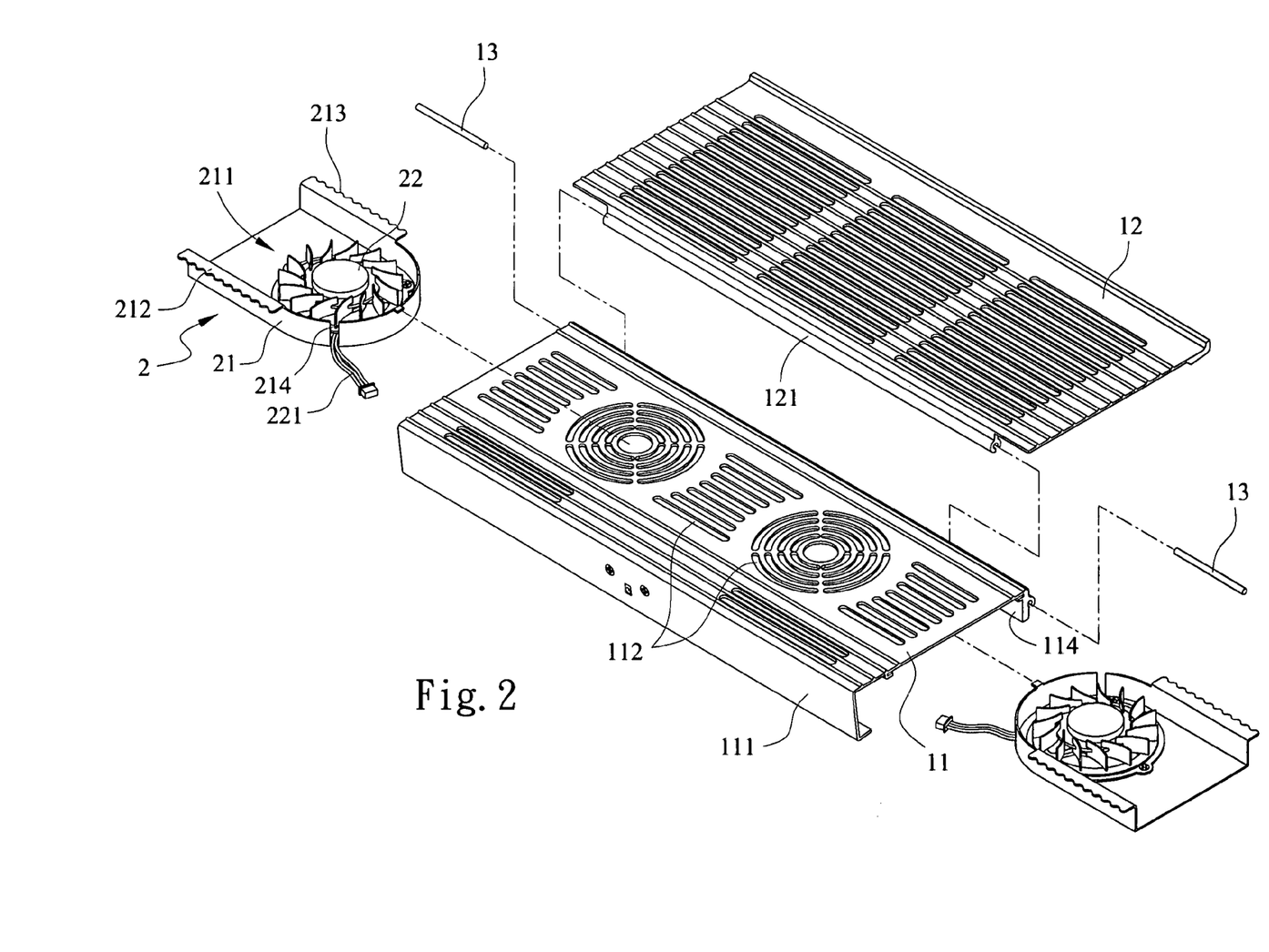
FIG. 2 is an exploded view of the heat sink pad of FIG. 1.
Figure 3:
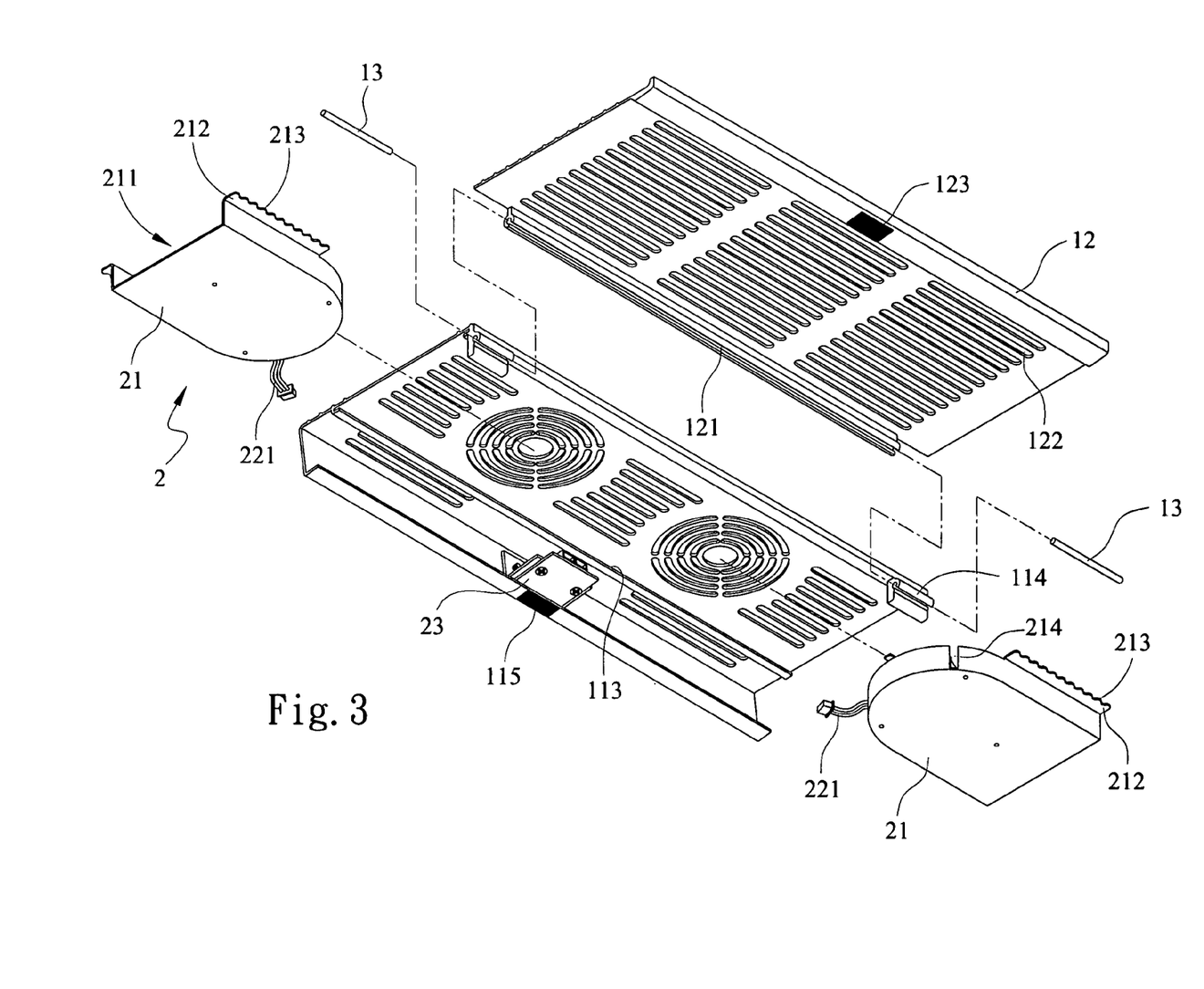
FIG. 3 is another exploded view of the heat sink pad of FIG. 1 from another aspect.

With reference to FIGS. 1, 2 and 3, a heat sink pad for notebook computer according to the present invention comprises a supporting unit 1 and a guiding unit 2. Positions of the guiding unit 2 are allowed to be freely adjusted thereof to suit for different notebook computers for dissipating heat effectively.

The supporting unit 1 is made by means of aluminum extrusion, die-casting or stamping. The supporting unit 1 is made of plastic, and includes a flat plate 10. The flat plate 10 comprises a first plate 11 with a supporting portion 111 bending downwardly at an end thereof, and a second plate 12 movably located at another end of the first plate 11. A plurality of through hole areas 112 are defined in the first plate 11 and adjacent the supporting portion 111. A guiding rail 113 is formed on a downward surface of the first plate 11. Latches 114 respectively extend downwardly from opposing ends of between the first plate 11 and the second plate 12. A sleeve 121 is formed on an edge of the second plate 12 for corresponding to the latches 114. Shafts 13 extend through the latches 114 and the sleeve 121 in assembly. A plurality of elongated holes 122 is defined in the second plate 12. An engaging portion 115 is formed on a side of the supporting portion 111. A mating portion 123 is formed on the second plate 12 for engaging with the engaging portion 115.

The guiding unit 2 is attached to the supporting unit 1 and adjacent the supporting portion 111. The guiding unit 2 includes two casings 21 movably provided on the guiding rail 113. Each casing 21 defines a slot 211 at a side thereof for corresponding to opposite sides of the first plate 11. Each casing 21 further forms wing plates 212 at opposite sides thereof and movable along the guiding rail 113. Each wing plate 212 forms an indented portion 213 at an edge thereof. A through hole 214 is defined in appropriate position of each casing 21. Fans 22 are respectively placed in the casings 21. Wires 221 extend through the through holes 214 to connect the fans 22 with a power connector 23 for obtaining external power. The power connector 23 is provided on the supporting portion 111 of the first plate 11.

Figure 4:
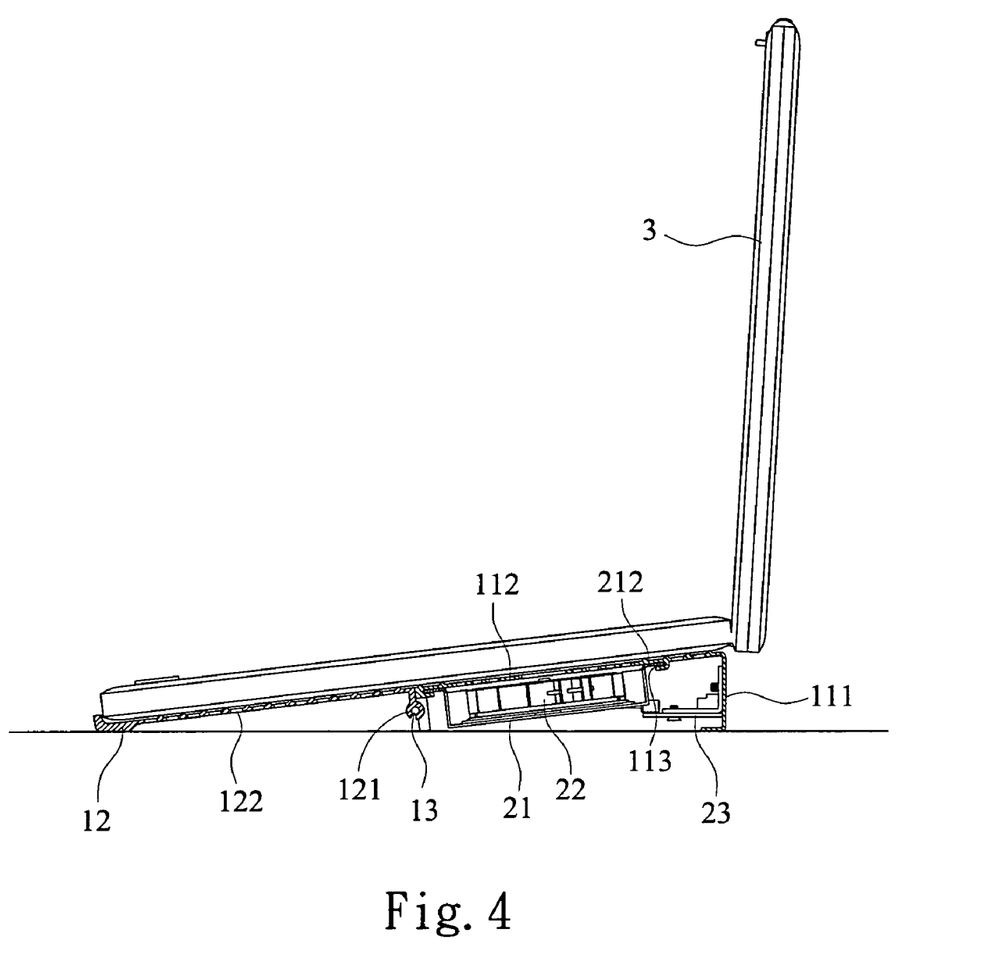
FIG. 4 is a schematic cross-sectional view of the heat sink pad in use.
Figure 5:
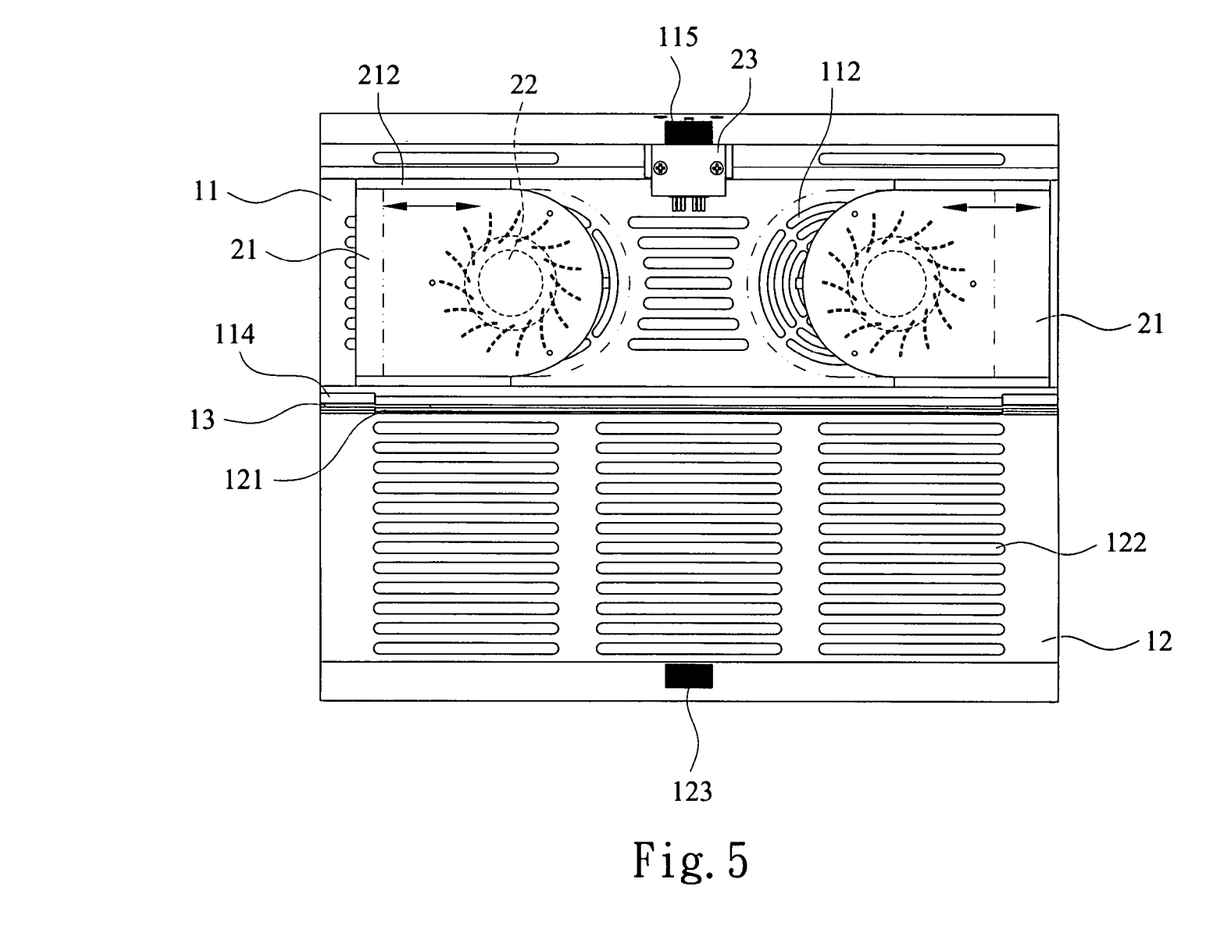
FIG. 5 is a schematic diagram of the heat sink pad being adjusted.
Figure 6:
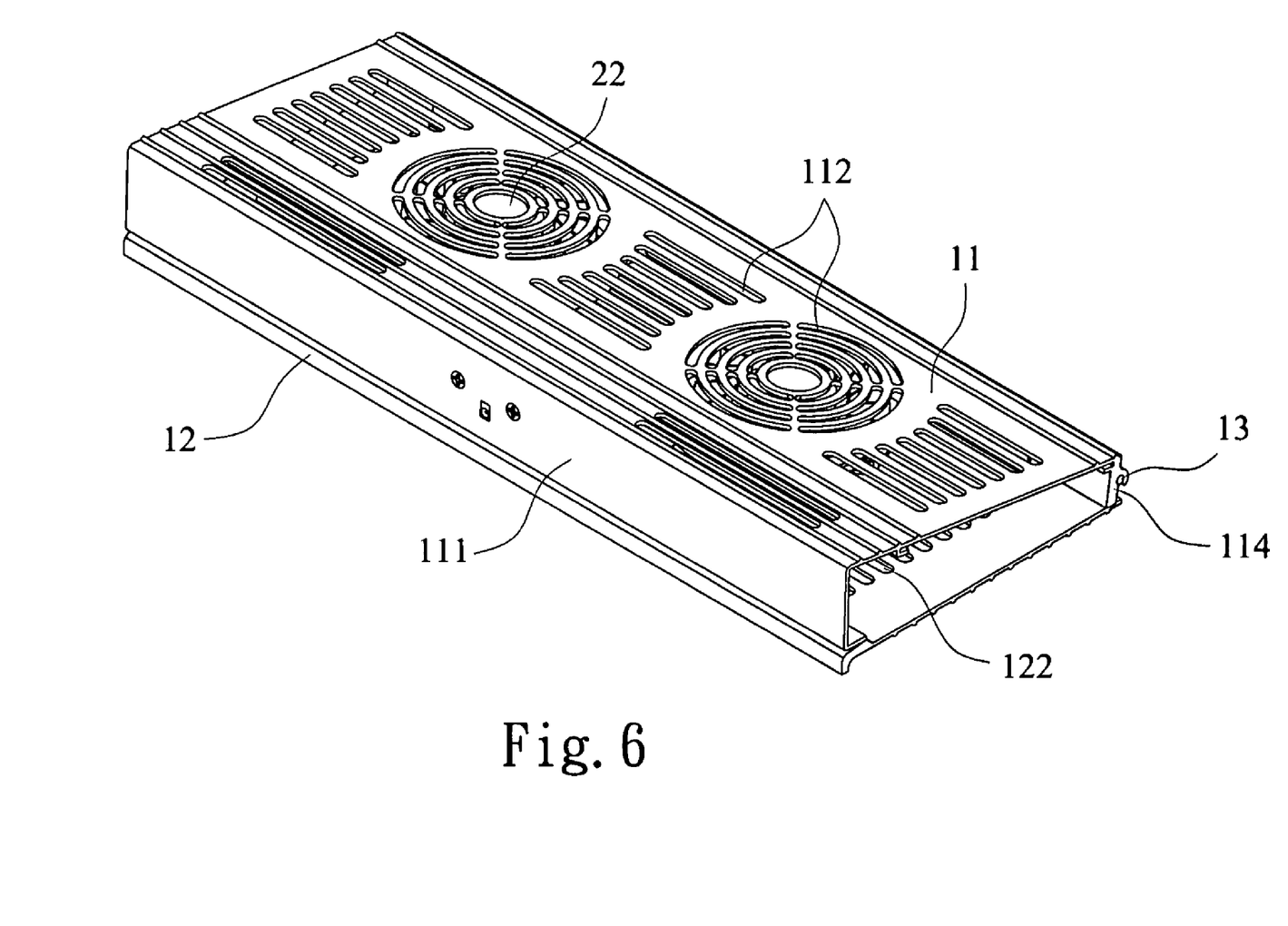
FIG. 6 is a schematic diagram of the heat sink pad being closed.

Referring to FIGS. 4, 5 and 6, in use, a notebook computer 3 is directly placed on the flat plate 10 of the supporting unit 1. The fans 22 of the guiding unit 2 absorb heat generated by the notebook computer 3 through the through hole areas 112. Then the fans 22 cooperate with the casings 21 to guide the heat out from the slots 211 for dissipating heat.

The guiding unit 2 adjusts positions randomly. The casings 21 move toward a side, for example toward left or toward right, which depends on types of the notebook computers. The wing plates 212 of the casings 21 slide along the guiding rail 113, putting the fans 22 to desired positions. The indented portions 213 of the wing plates 212 interferentially fit to the guiding rail 113, producing appropriate resisting force during the casings 21 moves, and finally, positioning the casings 21. Thus, the guiding unit 2 may be adjusted to meet diverse types of notebook computers for dissipating heat effectively.

To pack or carry the heat sink pad, the first plate 11 pivots with respect to the second plate 12. The latches 114 lock with the shafts 13 mounted on the sleeve 121. The engaging portion 115 of the first plate 11 engages with the mating portion 123 of the second plate 12. As shown in FIG. 6, the flat plate 10 is bendable to be packed or carried.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A heat sink pad for notebook computer comprising:
   a supporting unit including a flat plate, the flat plate having a supporting portion bending downwardly from an end thereof, a plurality of through hole areas being defined in the flat plate, a guiding rail being formed on a downward surface of the flat plate; and
   a guiding unit attached to the supporting unit and adjacent the supporting portion, and including two casings movable along the guiding rail, each casing defining a slot at a side thereof for corresponding to opposite sides of the flat plate, and at least a fan being placed in each casing.

2. The heat sink pad for notebook computer as claimed in claim 1, wherein the flat plate comprises a first plate with the supporting portion bending downwardly from an end thereof, and a second plate movably provided at another end of the first plate.

3. The heat sink pad for notebook computer as claimed in claim 2, wherein latches respectively extend from opposing ends of between the first plate and the second plate, wherein a sleeve is formed on an edge of the second plate for corresponding to the latches, and wherein shafts extend through the latches and the sleeve in assembly.

4. The heat sink pad for notebook computer as claimed in claim 2, wherein a plurality of elongated holes is defined in the second plate.

5. The heat sink pad for notebook computer as claimed in claim 2, wherein an engaging portion is formed on an edge of the supporting portion, and wherein a mating portion is formed on the second plate for engaging with the engaging portion.

6. The heat sink pad for notebook computer as claimed in claim 1, wherein each casing further forms wing plates at opposite sides thereof and movable along the guiding rail, and wherein a through hole is defined in appropriate position of each casing.

7. The heat sink pad for notebook computer as claimed in claim 6, wherein each wing plate forms an indented portion at an edge thereof.

8. The heat sink pad for notebook computer as claimed in claim 1, wherein wires connect the fans with a power connector, and wherein the power connector is provided on the supporting portion.

* * * * *